T. O. WERNER.
FRICTION SHOE AND METHOD OF MAKING THE SAME.
APPLICATION FILED DEC. 8, 1916.
1,262,887. Patented Apr. 16, 1918.
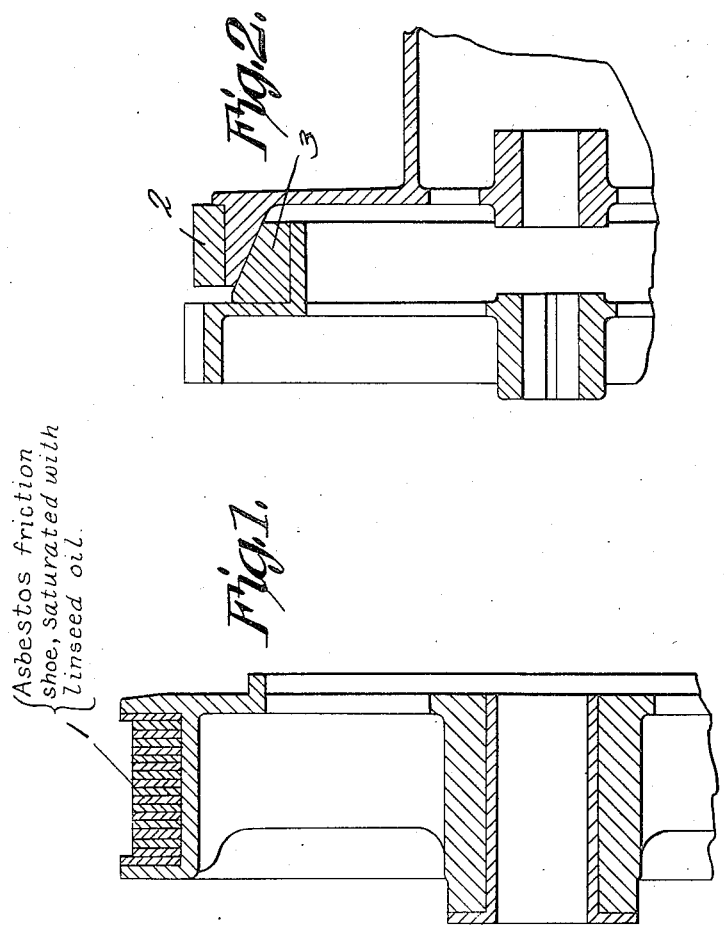

UNITED STATES PATENT OFFICE.

THOMAS O. WERNER, OF BANGOR, PENNSYLVANIA

FRICTION-SHOE AND METHOD OF MAKING THE SAME.

1,262,887.  Specification of Letters Patent.  Patented Apr. 16, 1918.

Application filed December 8, 1916. Serial No. 135,861.

*To all whom it may concern:*

Be it known that I, THOMAS O. WERNER, a citizen of the United States, residing at Bangor, in the county of Northampton and State of Pennsylvania, have invented a new and useful Friction-Shoe and Method of Making the Same, of which the following is a specification.

This invention relates to friction shoes and to a method of making the same. Heretofore where friction strips or blocks have been used on brakes of different types, clutches and the like, it has been the practice to use wood and other substances which soon become charred and otherwise unfit for use.

One of the objects of the present invention is to provide a friction shoe made up of specially treated asbestos and which will resist both heat and wear and constitutes a material improvement over friction devices heretofore used for like purposes.

With the foregoing and other objects in view the invention consists in certain novel steps in the method of making a friction shoe and in certain combinations of parts which will be hereinafter more fully described and pointed out in the claims.

In the accompanying drawings different forms of shoes embodying the present improvements have been shown.

In said drawings:—

Figure 1 is a section through a portion of a wheel having applied to its periphery one form of friction shoe.

Fig. 2 is a section through a portion of a clutch and showing portions of friction shoes combined therewith and embodying the present improvements.

In carrying out the present invention green asbestos mill board may be cut into segments and the segments assembled to form a block of desired proportions, as shown for example, at 1 in Fig. 1 or, if preferred, the asbestos may be cut into thick blocks such as shown at 2 and 3 in Fig. 2 instead of being built up as in Fig. 1.

After the asbestos has been properly shaped, it is thoroughly heated so as to cause all moisture to be driven therefrom. The heated block or shoe is then dipped in linseed oil until the heat of the block has drawn the oil by capillary attraction so as to partly or entirely fill the block. The block should then be examined to see if the oil has permeated to a sufficient depth. If not, an additional supply of oil can be applied in any manner desired. After the block has been properly saturated it is thoroughly heated so as to effect the oxidation of the oil after which the block can be applied and used for the purposes intended. In heating the saturated block care is exercised to prevent the oil from burning. The temperature to which the article is heated is preferably slightly less than that of the burning point of the oil.

It has been found that by treating asbestos in the manner described and using the product as a friction shoe, it will resist heat, will constitute an efficient friction element, and will also outlast other forms of friction materials commonly employed. As the block wears down in use and the oil contained therein becomes oxidized, additional oil can be applied to the block or shoe with a brush or other device and the heat created by friction of the shoe against an opposed friction element will result in this applied oil being absorbed into the block and dried. Thus by successive applications, practically all of the block can be used down to a very thin segment.

A friction shoe such as described is not only useful in connection with car brakes and like structures but also in friction clutches and parts of hoisting machinery and the like.

What is claimed is:—

1. A friction shoe consisting of asbestos having, throughout its thickness, an oil filler oxidized by the action of heat.

2. A friction shoe consisting of asbestos mill board having, throughout its thickness, an oil filler oxidized by the action of heat.

3. A friction shoe consisting of asbestos mill board having, throughout its thickness, a filling of linseed oil oxidized by the action of heat.

4. The herein described method of producing a friction shoe which consists in shaping green asbestos mill board, driving moisture therefrom by heat, dipping the heated material into linseed oil to saturate said material throughout its thickness, and subsequently heating the material to oxidize all portions of the oil.

5. The herein described method of forming a friction shoe which consists in forming green asbestos into a desired shape, heating the asbestos to remove moisture therefrom, dipping the asbestos into linseed oil to fill the asbestos, and then heating the asbestos to oxidize the oil.

In testimony that I claim the foregoing as my own, I have hereto affixed my signature in the presence of two witnesses.

THOMAS O. WERNER.

Witnesses:
 IVY E. SIMPSON,
 PHILOMENA A. ROCKELLE.